United States Patent [19]

Brüning et al.

[11] Patent Number: 4,710,392

[45] Date of Patent: Dec. 1, 1987

[54] FLAVORING WITH OCT-2-EN-4-OL

[75] Inventors: Jürgen Brüning; Roland Emberger; Rudolf Hopp; Theodor Sand, all of Holzminden, Fed. Rep. of Germany

[73] Assignee: Haarmann & Reimer GmbH, Holzminden, Fed. Rep. of Germany

[21] Appl. No.: 846,661

[22] Filed: Mar. 31, 1986

[30] Foreign Application Priority Data

Apr. 4, 1985 [DE] Fed. Rep. of Germany ....... 3512339

[51] Int. Cl.⁴ ............................................ A23L 1/235
[52] U.S. Cl. .................................................. 426/534
[58] Field of Search ......................................... 426/534

[56] References Cited

U.S. PATENT DOCUMENTS 3,920,752 11/1975 Lamparsky ......................... 568/448

OTHER PUBLICATIONS

Arctander, Perfume and Flavor Chemicals, 1969, vol. I, published by the Author: Montclair, N.J., Monograph, No. 231.
Furia et al., Fevaroli's Handbook of Flavor Ingredients 2nd Ed., 1975, vol. I, CRC Press: Cleveland, pp. 386–387.
Chemical Abstracts, 103, 15:119978K, Oct. 14, 1985.

*Primary Examiner*—Joseph Golian
*Attorney, Agent, or Firm*—Sprung Horn Kramer & Woods

[57] ABSTRACT

The invention relates to the use of oct-2-en-4-ol as a flavor, and to flavoring compositions containing this compound.

2 Claims, No Drawings

FLAVORING WITH OCT-2-EN-4-OL

The invention relates to the use of oct-2-en-4-ol as a flavour, and to flavouring compositions containing this compound.

The compound oct-2-en-4-ol is known; it has been employed as a starting material in investigations concerning cleavage reactions of $\alpha,\beta$-unsaturated carbinols in the presence of an alkali (J. Chem. Soc. 1947, 756). In J. Food Science 47, 1444 (1982), oct-2-en-4-ol is mentioned as a probable constituent of the volatile aroma components of fresh, frozen beef stew. There are no known data regarding the organoleptic properties of oct-2-en-4-ol.

It has now surprisingly been found that oct-2-en-4-ol has excellent organoleptic properties which make it a valuable flavour. Oct-2-en-4-ol is distinguished by a relatively low taste threshold (30 ppb in 5% strength sugar solution). For a dose of 0.5 ppm in 5% strength sugar solution, the flavour is described as "very typically overripe cherries, fruity, juicy, apple, pear peel". In addition to its specific characterisation as tending toward cherries, oct-2-en-4-ol produces interesting flavour effects in aroma compositions. Thus, for example, in fruit aromas, the juicy notes are emphasised, the fruitiness promoted and the naturalness of the aroma character reinforced.

The invention therefore relates to the use of oct-2-en-4-ol as a flavour, and to flavouring compositions which contain oct-2-en-4-ol.

The flavouring compositions prepared using oct-2-en-4-ol can be employed in the entire foodstuffs and luxury foods sectors. They are particularly suitable for fondants, fruit jellies, sweets, dairy products, desserts, beverages and spirits.

The oct-2-en-4-ol according to the invention is used in amounts of 30 ppb to 100 ppm, preferably 0.1 ppm to 10 ppm, relative to the ready-to-consume foodstuff or luxury food.

Oct-2-en-4-ol can be prepared by the process described in J. Chem. Soc. 1947, 757, by reacting butylmagnesium bromide with crotonaldehyde or by reacting a solution of butyllithium in toluene with crotonaldehyde.

EXAMPLE 1

31.5 g of crotonaldehyde are added dropwise, at $-20°$ C. in the course of 75 minutes, to 32 g of butyllithium, dissolved in 145.8 g of toluene. After the reaction has proceeded for two hours, the temperature increasing slowly to $0°$ C., 250 ml of water are carefully added dropwise. The aqueous phase is separated off and washed once with 100 ml of toluene. The combined organic phases are washed neutral with water, dried over sodium sulphate and distilled. 46 g of oct-2-en-4-ol of boiling point $68°-72°$ C./13 mb are obtained. According to the gas chromatogram, the purity is 96%. The NMR spectrum confirms the expected structure.

EXAMPLE 2

A flavouring composition having a cherry aroma is prepared by mixing the following constituents:

| | |
|---|---|
| Eugenol | 2 |
| Heliotropin | 5 |
| Vanillin | 5 |
| Maltol | 5 |
| Geranyl butyrate | 30 |
| Benzaldehyde | 40 |
| p-Tolylaldehyde, 10% strength in ethanol | 25 |
| Triacetin | 888 |
| | 1000 |

The above flavour is employed in an amount of 10 g per 100 l of beverage. The solution was a pronounced cherry flavour.

If, in the above aroma recipe, the 50 parts of triacetin are replaced with 50 parts of oct-2-en-4-ol, the aromatised solution acquires a substantially more typical, fuller, more natural cherry juice flavour.

EXAMPLE 3

An aroma composition having a plum aroma is prepared by mixing the following constituents:

| | |
|---|---|
| Dimethylbenzylcarbinyl butyrate | 50 |
| Benzaldehyde | 20 |
| Wine lees oil | 5 |
| $\gamma$-Undecalactone | 5 |
| Vanillin | 50 |
| Maltol | 10 |
| Mandarine oil | 5 |
| Propylene glycol | 855 |
| | 1000 |

The above aroma is employed in an amount of 10 g per 100 l of 5% strength sugar solution. The solution has a pronounced plum flavour.

If, in the above aroma recipe, the 20 parts of propylene glycol are replaced with 20 parts of oct-2-en-4-ol, the aromatised sugar solution acquires a much more pronounced, fuller and more natural plum flavour.

What is claimed is:

1. An edible composition comprising a foodstuff and an amount of oct-2-en-4-ol effective to impart a cherry flavour to the composition.

2. The edible composition of claim 1, wherein the oct-2-en-4-ol is present in an amount of 30 ppb to 100 ppm.